J. E. MILLIREN.
GLASS DRAWING BAIT.
APPLICATION FILED JAN. 2, 1912.
1,075,220.
Patented Oct. 7, 1913.
2 SHEETS—SHEET 2.
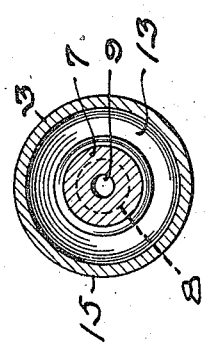
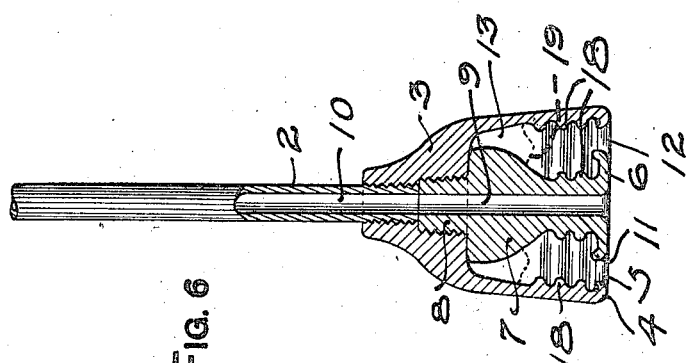
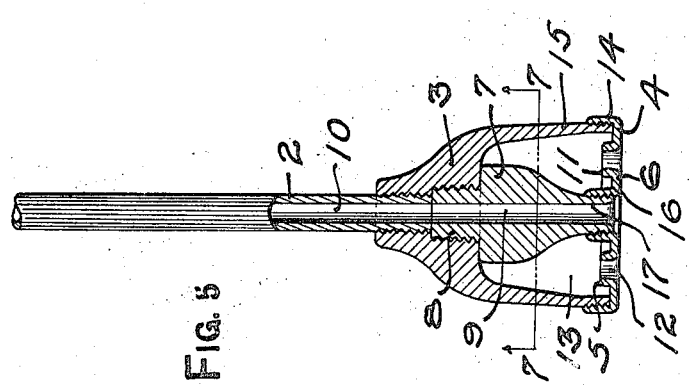
WITNESSES
M A Barth
Lillian Bates
INVENTOR
John E. Milliren
by Bakewell & Keller
his attys

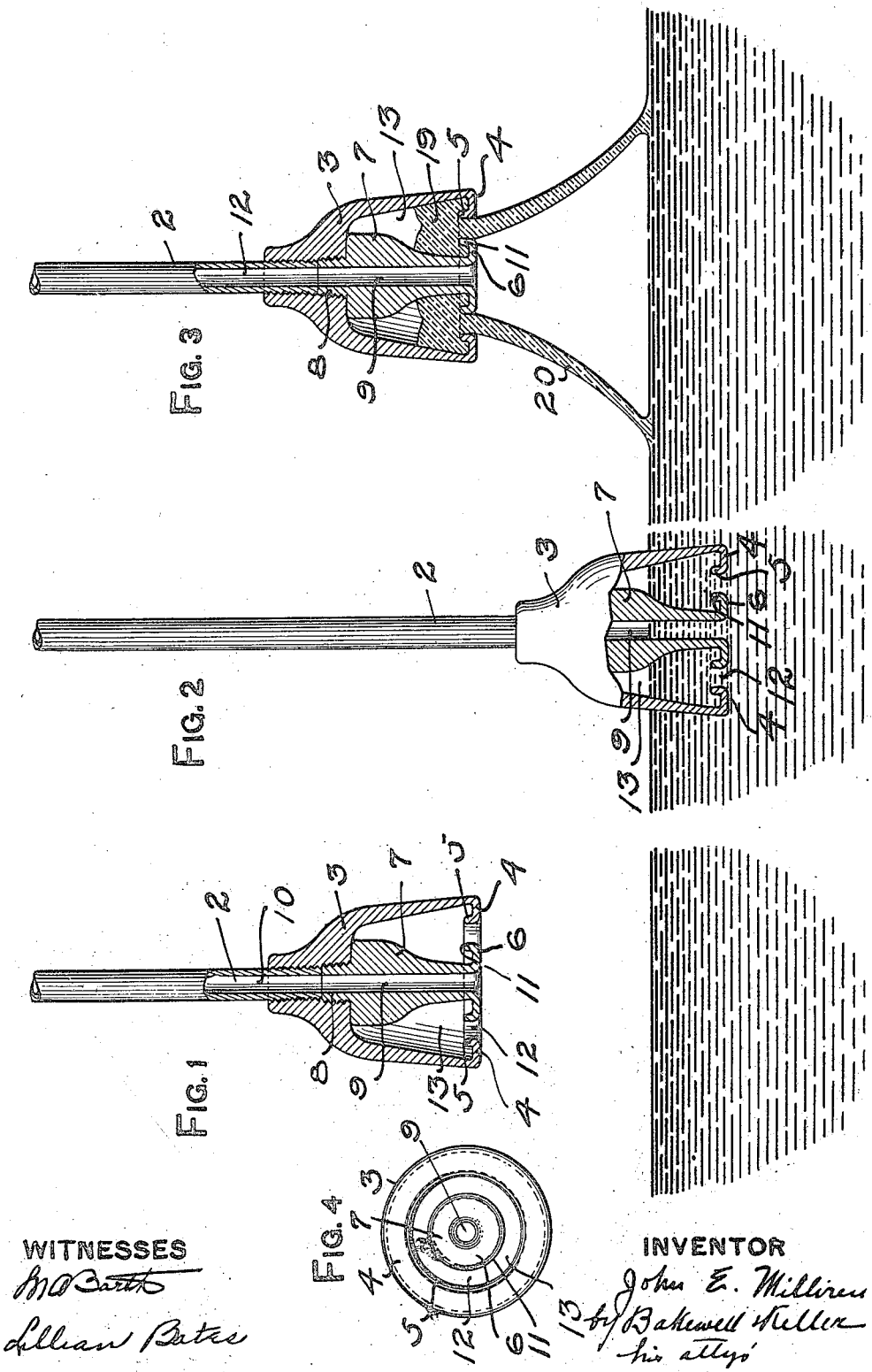

UNITED STATES PATENT OFFICE.

JOHN E. MILLIREN, OF FALLS CREEK, PENNSYLVANIA.

GLASS-DRAWING BAIT.

1,075,220.

Specification of Letters Patent.  Patented Oct. 7, 1913.

Application filed January 2, 1912. Serial No. 668,991.

*To all whom it may concern:*

Be it known that I, JOHN E. MILLIREN, a citizen of the United States of America, residing at Falls Creek, in the county of Jefferson and State of Pennsylvania, have invented new and useful Improvements in Glass-Drawing Bait, of which the following is a full, clear, and exact description, reference being had to the accompanying drawings, which form part of this specification.

This invention relates to the drawing of cylinders from molten glass, which cylinders are subsequently split and flattened in the manufacture of sheet glass. It has particular reference to the bait used in the drawing of the cylinder. Fracture of the glass cylinder and falling away thereof from the bait, as the bait is lifted, frequently occurs in this drawing operation. This difficulty is due primarily to the cooling of the glass at its point of juncture with the bait and also the working loose of the neck of the cylinder from the bait, under operative strains.

By my invention I provide a bait which enables positive engagement and support of the glass cylinder and which serves to retain heat sufficient to prevent rapid cooling and snapping of the same as the bait is elevated.

I also aim to provide certain other advantageous features of construction, as will be hereinafter more fully described.

In referring to the accompanying drawings in describing my invention, it will be premised that I do not limit myself to the specific construction illustrated, the same being capable of being varied in a number of ways without departing from the spirit of my invention.

Figure 1 is a vertical sectional view of a bait embodying my invention, the same being positioned above molten glass from which the cylinder is adapted to be drawn; Fig. 2 is a similar view, showing the bait lowered into the molten glass preparatory to the drawing of the cylinder; Fig. 3 is a similar view, showing the bait lifted and the initial formation of the cylinder, viz., the neck or top of the cylinder; Fig. 4 is a bottom plan view of the bait; Fig. 5 is a view similar to Fig. 3 but showing a modified manner of forming the lower portion of the bait; Fig. 6 is a similar view showing the bait provided with a series of supporting shoulders, and to be hereinafter more fully referred to; Fig. 7 is a section on the line 7—7 of Fig. 5.

The glass drawing bait as shown is supported by the pipe 2 which may be connected to a suitable source of air supply or other medium for imparting fluid pressure to the interior of the cylinder as it is drawn from the molten glass. This pipe 2 carries at its lower end, preferably by screw threaded connection, the main body portion 3 of the bait which body is substantially of an inverted cup shape and is provided with the inwardly directed horizontal flange portion 4 which may be upwardly directed as indicated at 5. A flange 6 of a character similar to that of the flange 4 is carried by the central head or core portion 7 which core is also preferably screw threaded into the member 3 by means of the stud end 8. This core has the passage-way 9 connecting with the passage-way 10 of the pipe or tube 2. The flange 6 lies in direct opposition to the flange 4 as is clearly shown in Fig. 1, and is provided with an edge portion 11 extending upwardly, as shown, and which is spaced from the portion 5 of flange 4, thereby forming an annular slot or opening 12 leading into the chamber 13 which chamber is formed by the interior wall of the member 3 and the exterior face of the core 7.

As shown in Fig. 5, I may form the lower edge of the bait, which constitutes the flanges 4 and 6, so as to be capable of separation from the main portion of the bait. This may be done by providing an annular ring member 14 which is screw threaded to the wall 15 of the bait and carries the flange 4, and an annular member 16 which carries the flange 6 and is secured to the terminal portion 17 of the core 7 in like manner. This enables the lower operative face of the bait to be removed and replaced, when it is desired so to do.

I may also form the bait with a plurality or series of shoulders or corrugations 18, as shown in Fig. 6, which corrugations are disposed above the flanges 4 and 6. This form of bait would be found advantageous in the drawing of cylinders of heavy and unusual length, as the supporting means is greatly augmented thereby.

In drawing the glass cylinder the bait is lowered as shown in Fig. 2 into the molten glass to a depth sufficient to cause the glass to rise within the chamber 13 to a height preferably two-thirds that of the chamber. When the bait is subsequently lifted, in the usual manner, the body of glass 19 within the chamber 13 sets sufficiently to support the neck portion 20 of the cylinder as the bait is lifted. As the passage way 10 of the tube 2 has connection with the interior of the glass cylinder only through the passageway 9 of the core 7, the air which exerts pressure on the interior of the glass does not impinge upon and suddenly cool the glass at its point of juncture with the bait. Furthermore, with the absence of contact of the incoming air with the neck or nipple portion 19, and the consequent prevention of the chilling thereof, the neck of the glass is kept in a condition conducive to tenacious engagement with the bait and this prevention of cooling is aided by the harboring or retention of the heat of the chamber 13, due to the fact that the core 7 is preferably of such thickness as to prevent the incoming air from lessening the heat in the chamber, such thickness permitting the core to absorb and radiate or return the heat.

An advantageous feature of my improved bait is the peculiar support given to the glass cylinder by the bait, the shoulder formation or flange construction being such that the neck or cap is evenly supported at both sides of the wall of the glass, thus preventing the neck from working loose and being dislodged from the bait. This double support also obviates the trouble arising from the action of expansion and contraction of the bait.

The construction shown in Fig. 5 presents a desirable feature in that the lower operative face of the bait may be removed and replaced when such part becomes damaged or worn, and presents other desirable features such as permitting of the application of ring members 14 and 16 of different sizes for variations in the width of the slot 12, it being understood that the width of the slot 12, to a certain extent, is determinative of the thickness of the wall of the glass cylinder being drawn.

Other advantages of my invention will be appreciated by those skilled in the art. The construction shown enables the ready disassembling of the bait for cleaning or other purposes and presents an embodiment of the desirable features of heat retention and efficacious support of the glass cylinder.

The shape of the bait may be varied without departing from my invention and the particular manner of retaining the heat and supporting the glass may find different embodiments from that shown and I do not, therefore, as stated above, desire to limit myself to the specific device illustrated.

Having thus described my invention, what I claim and desire to secure by Letters Patent is:—

1. A glass drawing bait comprising a body portion having an annular receiving chamber provided with an opening at the lower portion of the bait and having a plurality of oppositely disposed shoulders adapted to form a support for the glass article.

2. A glass drawing bait comprising a body portion having an annular glass receiving chamber provided with a lower opening and having a plurality of oppositely disposed shoulders provided with upwardly extending ledge portions, the shoulders being adapted to form a support for the glass article.

In testimony whereof, I have hereunto set my hand.

JOHN E. MILLIREN.

Witnesses:
  MARY A. BARTH,
  M. A. KELLER.